Patented Feb. 12, 1924.

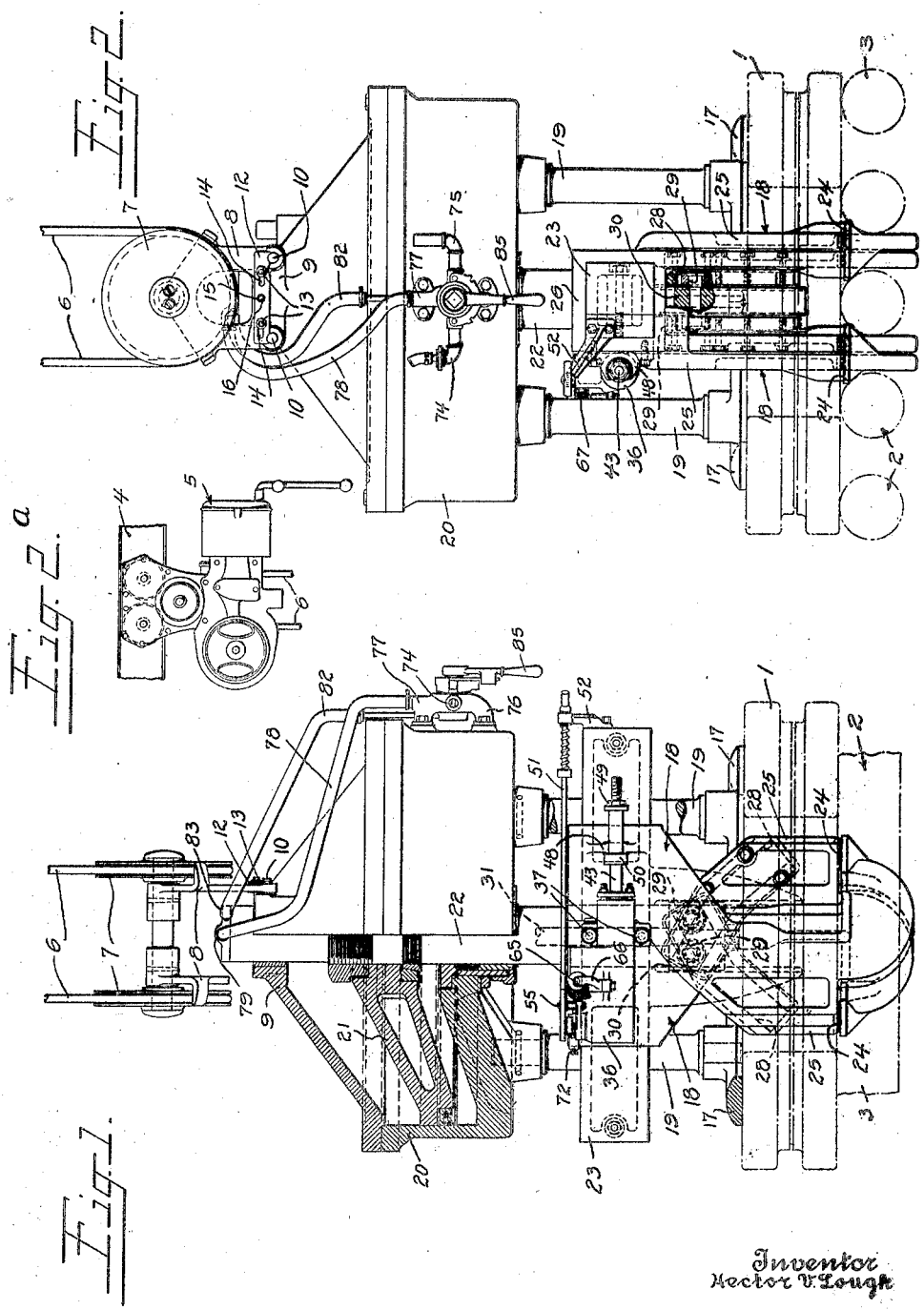

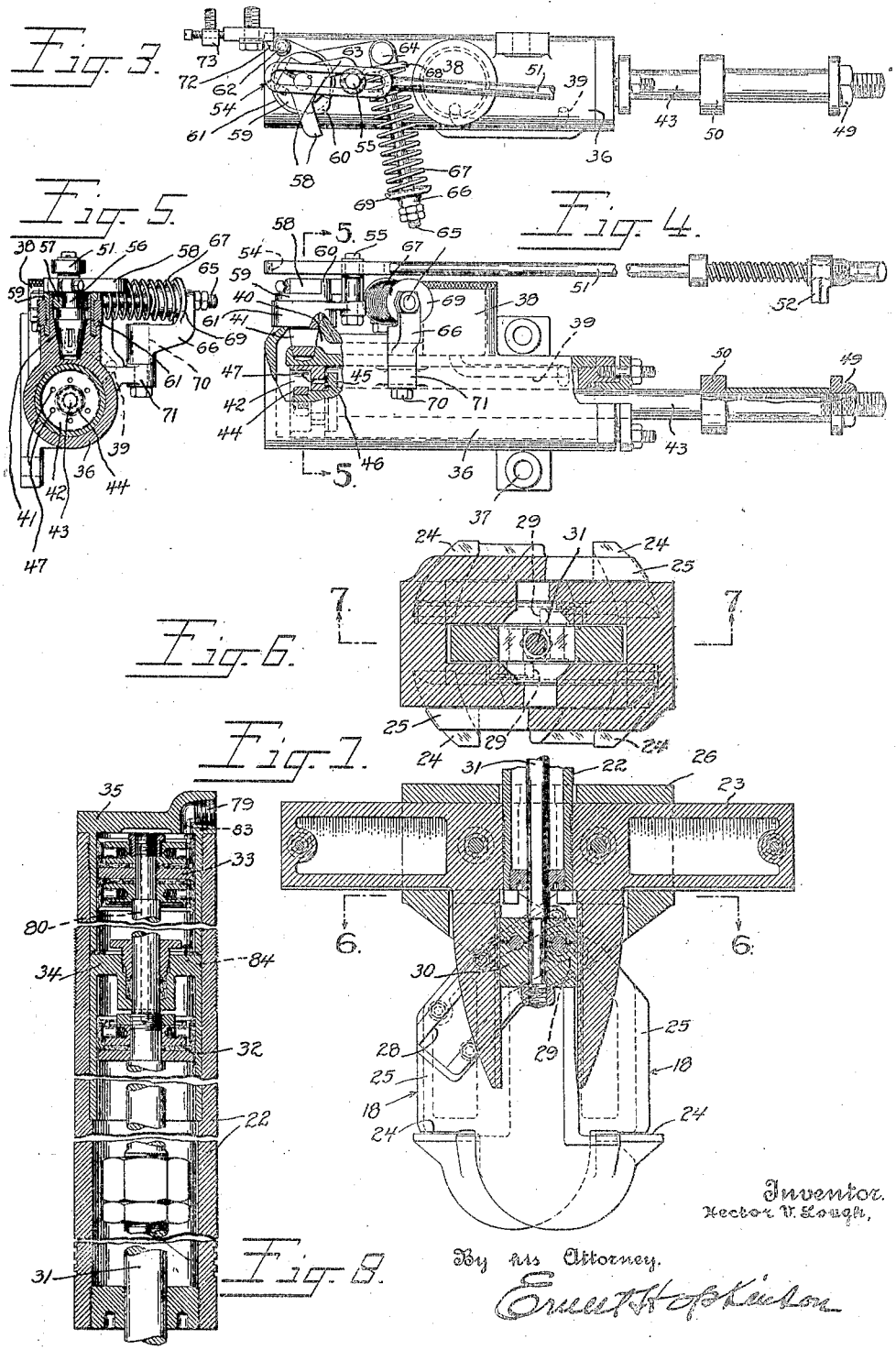

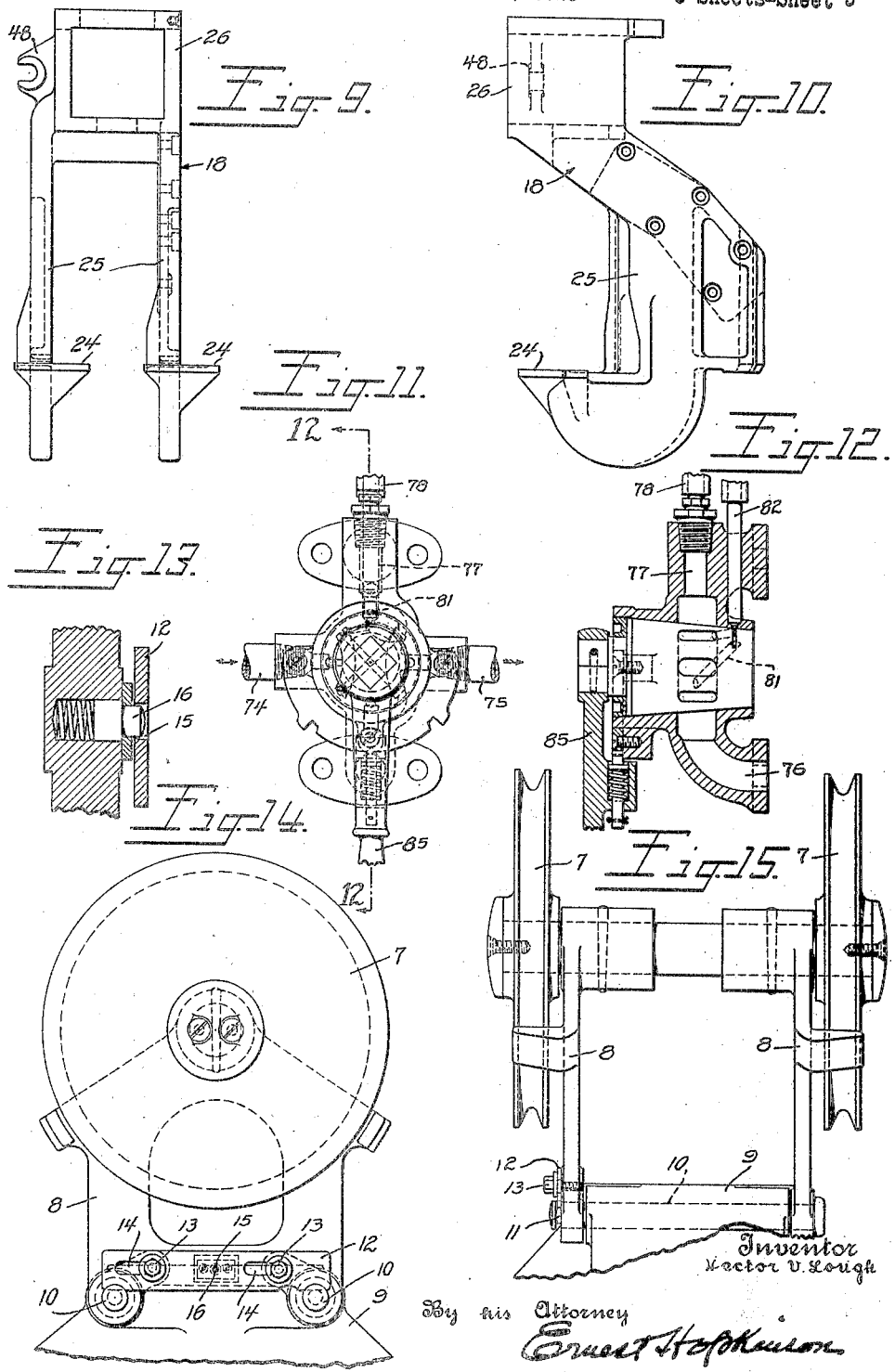

1,483,359

UNITED STATES PATENT OFFICE.

HECTOR V. LOUGH, OF HARTFORD, CONNECTICUT, ASSIGNOR TO THE HARTFORD RUBBER WORKS COMPANY, A CORPORATION OF CONNECTICUT.

PORTABLE MOLD-CLOSING PRESS.

Application filed April 1, 1921. Serial No. 457,681.

*To all whom it may concern:*

Be it known that I, HECTOR V. LOUGH, a subject of the King of Great Britain, residing at Hartford, in the county of Hartford and State of Connecticut, have invented a new and useful Portable Mold-Closing Press, of which the following is a full, clear, and exact description.

This invention relates to a portable type of press for closing the sections of tire curing molds preliminary to their clamping and curing treatment.

Tires are usually cured in annular molds having sections which are grooved in their opposed meeting faces to receive the carcass. In certain instances the mold sections are secured together by clamps before a high fluid pressure is applied to the interior of the carcass. Each mold having ten or more clamps, it has been found advantageous to make them of the dumb-bell type, i. e., with heads a fixed, or relatively fixed, distance apart to eliminate tedious and costly manipulation. As the sections of the mold, however, do not ordinarily come close enough together to permit the ready introduction of these clamps into slots with which the molds are provided, pressure must be applied to close the mold.

The present invention aims to provide a portable type of mold-closing press which will facilitate the ease and rapidity of introducing the mold clamps without the necessity of costly transport to some fixed station. Further, and especially, it aims to provide a type of press that will permit closing the mold while on a conveyor. Incidentally it shortens the time between cures, and thus reduces heat lost by radiation while the molds are outside of the vulcanizing press. Other advantages will appear later in the detailed description.

With the embodiment of the invention illustrated in the drawings in mind, and without intention to limit its scope more than the prior art requires, it may be said to consist of an abutment ring and cooperating clamping members that terminate in jaws and may be passed down through the open center of the annular mold, then advanced outward to center the ring on the mold, then retracted to clear the slots in the mold, and then raised to squeeze the sections of the mold together and onto the carcass. Fluid pressure devices are associated with the ring and clamping members to actuate them, and the whole mechanism is preferably portably supported for transport along in the direction of and above a conveyor for the molds.

The invention is illustrated in the accompanying drawings in which,

Fig. 1 is an elevation partly in section, with the apparatus in working relation with a mold, which latter is shown supported on a conveyor;

Fig. 2 is an elevation at right angles to that shown in Fig. 1;

Fig. 2ª illustrates diagrammatically a suitable type of mono-rail hoist by which the press may be suspended and moved about above a conveyor;

Figs. 3, 4, and 5 are plan, side and sectional views respectively, of an oil check mechanism for governing retraction of the jaws to a predetermined extent;

Fig. 6 is a horizontal section through jaws on the line 6—6, Fig. 7, and

Fig. 7 is a vertical section through the jaws and their supporting cross head taken on a plane indicated by the line 7—7, Fig. 6.

Fig. 8 is a vertical section through the hollow tubular lift piston rod showing the nested arrangement therewith of auxiliary or spreader pistons and their common piston rod;

Figs. 9 and 10 are elevations of one of the clamping members;

Figs. 11 and 12 show in front elevation and vertical section details of a valve for governing the supply and exhaust of air to the pistons;

Fig. 13 is a detail of a detachable connection between an electric hoist and the press proper, and Figs. 14 and 15 illustrate further details of this detachable connection.

As has been before indicated, the device is primarily intended for closing molds of the sectional type indicated at 1, while they are supported upon a conveyor 2 having at least one section with freely revoluble rollers or members 3 that permit blocking the molds and gathering or accumulating a number thereof on it in the manner fully disclosed in an application of H. J. Hoyt, Serial No. 185,027, filed August 8th, 1917, and of a type similar to that shown in a patent to Mason No. 614,306, November 15, 1898.

It being desirable to shift the device from one mold to another resting on the conveyor, and possibly also in some instances to permit the devices to be moved with the molds so that they may be closed while moving, an I-beam 4 is fixed above a conveyor to support a movable electric or pneumatic hoist indicated generally at 5. The hoist 5 may be of any suitable type, but is preferably of the construction diagrammatically shown and provided with cables 6 which encircle sheaves 7 which are rotatably mounted in spaced plates 8. The plates 8 are connected to the head of the press, which is indicated at 9 and preferably but not necessarily by a detachable form of connection. As shown in detail in Figs. 1, 3 and 5, inclusive, this comprises pins 10, passed through the head 9 and both of the plates 8, headed at one end as shown and in their other end slotted as indicated at 11 to receive a keeper 12 in the form of a strip. The strip 12 is slidably secured flat against one of the plates 8 by screws 13 which pass through slots 14. Centrally a hole 15 is provided in the strip 12. Into the hole 15 a spring-pressed detent 16, socketed in one of the plates 8, is adapted to snap to hold the keeper in place. By withdrawing the detent 16 the keeper 12 may be shifted to the right, as viewed in Fig. 14 so as to be disengaged from the slots 11 in the pins 10 and thereby permit detachment of the press from the travelling hoist.

The press proper comprises essentially an abutment in the form of a ring 17, clamping members indicated generally by the numeral 18, and devices for operating the clamps.

From the abutment member 17 rise stanchions 19 which are suitably secured to and at times support a cylinder 20 of the form shown in cross-section in Fig. 1. In the cylinder 20 operates a piston 21, which is mounted on a hollow or tubular rod 22 that depends downwardly from the cylinder and carries at its lower end a large cross head 23. On the cross head 23 the clamping members 18 are mounted. Vertical movement of the clamping members 18 is effected by shifting the piston 21.

There are two angular clamping members 18 of substantially the same construction but disposed oppositely. A description of one in detail will suffice for both. The single clamping member shown in Figs. 9 and 10 has two substantially horizontal mold-engaging portions or jaws 24, two vertical body portions 25, and a single head 26 offset from the body portions 25 and directly above the jaws 24. The head 26 is of the box-like form shown for sliding engagement with the correspondingly shaped cross head 23. The construction of the clamping members is such that their jaws may move past one another as shown in Fig. 2 and also straddle a tread section of the conveyor. The opposite angular formation of the clamping member permits them to be retracted to the position shown in Fig. 1 so as to be passed downwardly through the opening in the annular mold until the abutment ring 17 rests upon the same, when their jaws 24 will be below the plane of the lower surface of the mold. Then the clamping members may be shifted or spread so as to position their jaw portions 24 substantially below and in opposition to the abutment ring 17.

The clamping members 18 are each provided with channels 28 constituting cams, see Figs. 1, 2 and 7. In the channels are received rollers 29 extending from and rotatably pinned to opposite sides of a block 30. The block 30 is fastened to an auxiliary or spreader piston rod 31, which, as shown best in Fig. 8, has secured to it in tandem arrangement a pair of pistons 32 and 33. These pistons are reciprocable inside cylinders secured within the tubular lift piston rod 22 which intermediately is partitioned off by a member 34 the upper cylinder having a closure cap portion 35. By suitably applying fluid under pressure to the upper sides of the pistons 32 and 33, the block 30 may be positively moved downward and in its movement, of course, through the instrumentality of the rollers 29 and cam channels 28 will move the clamping members simultaneously outward until halted by engagement of their vertical body portions 25 with the inner periphery of the mold. If one clamping member engages the mold before the other, the press will ordinarily be shifted until its abutment ring 17 is in concentric relation with the mold.

After the clamping members have been lowered through a mold, and after they have been spread to engage its inner periphery, it is desirable to retract the jaws radially of the mold a distance sufficient to permit access to its inner periphery in order to facilitate introduction of the mold clamps or "dumbbells" in registering slots in the mold sections. For this purpose, the cylinder 36 of an oil check mechanism illustrated in detail in Figs. 3 to 5 inclusive is bolted as indicated at 37, Fig. 1, to the cross head 23, substantially midway its length, and between the two box-slides or heads 26 of the clamping members when in their most retracted positions. The cylinder 36 is provided with an accessible reservoir 38 which is in communication through a duct 39 with one end of the cylinder and with the opposite end through a duct 40 and tapered valve plug 41. In the cylinder 36 is a piston 42 which is loosely connected to its rod 43 by a nut 44 and flange 45 suitably spaced apart. Between the piston 42 and the flange 45 which is integral with the rod 43 a leather or other suitable washer 46 is mounted, being secured to the flange 45. The construction is such that movement of the piston rod 43 to the left as viewed in Fig. 4 will cause the washer 46 to seal holes 47 provided in the piston 42 whereas movement of the rod 43 to the right will permit fluid in the cylinder to pass through the holes 47.

At the outset of a mold clamping operation, when the jaws are fully retracted, the valve plug 41 stands closed. After the jaws have been lowered they are separated or spread. In their spreading movement a lug 48 on one of the clamping members 18, which lug is slotted as clearly indicated in Fig. 9 to embrace the piston rod 43, engages the flanged portion of a nut 49 threaded on the end of the rod 43 in predetermined spaced relation from a collar 50. Engagement of the slotted lug 48 with the nut 49 will move the piston rod 43 to the right and the piston 42 likewise. At this time the holes 47 in the piston are uncovered and oil in front of the piston passes freely therethrough. Thus the clamping members are permitted to move outwardly as far as necessary to engage their body portions 25 with the inner periphery of the mold.

When the clamping members are moved in the opposite direction, i. e., are retracted, the slotted lug 48 moves from the nut 49 without action on the rod 43 until it engages the collar 50, when the sealing washer 46 will close the holes 47 in the piston. The valve plug 41 being closed, the oil confined in the left hand end of the cylinder 36 will positively resist further movement of the piston. Through the piston rod 43 and slotted lug 48, the retracting movement of the clamping members will thus be halted, it being understood that the fluid pressure employed to actuate the block 30 (and through the rollers 29 and cam grooves 28 the clamping members 18) is low enough to permit such halting without breakage.

Before the mold clamps can be introduced in slots in the molds, the clamping members 18, of course, have to be lifted to bring the sections of the mold together. This is done by applying fluid pressure to the under side of the main piston 21. By exhausting air from below the main piston 21 the clamping members are lowered and then completely retracted to a position such that they may be drawn up through the center of the mold.

To render the oil check mechanism substantially self-acting or semi-automatic, a coil spring is utilized in a mechanism which will now be described. The upright stem 56 of the valve plug 41 is journaled in an externally threaded collar 57 screwed in a boss rising from and integral with the seat of the valve plug 41. To the upper end of the stem 56 is affixed a member having at nearly right angles a pair of arms 58. Immediately below the arms 58 and fixed to the cylinder is a member 59 having an upright projection or stop 60 that is adapted to be engaged by one or the other of the arms 58. On the fixed member 59 is journaled a sleeve 61 carrying a roller 62 on one side and also having an integral arm 63 which is loosely pinned at 64 to a rod 65. The rod 65 passes loosely through an arm 66 and has a spring 67 coiled about it whose opposite ends bear against thrust collars 68 and 69. The arm 66 is swiveled on a pintle 70 which is suitably anchored to a bracket arm 71 integral or otherwise fixed to the oil cylinder 36. To that clamping member 18 which is shown at the left of Fig. 1, a finger 72 is adjustably fastened as indicated generally at 73 and this finger is adapted to engage the roller 62 immediately prior to the complete retraction of the clamping members. The rod 51 is supported at one end by a bracket 52 which is attached to the cross head 23, and is slotted in its other end as indicated at 54 to embrace a pin 55 that is fixed to the rotatable arm 63. The rod 51 is normally held by a spring in the position shown in Figs. 3 and 4.

After the mold has been closed and the clamps inserted in position, the jaw portions 24 are first lowered to permit complete retraction thereof. But before this complete retraction can be effected the valve plug 41 must be turned from its closed to an open position. When the valve plug 41 is in a closed position the pin 55, which is fixed to the arm 63, occupies a position in a clock-wise direction approaching 90° from that shown in Fig. 3. Preliminary to complete retraction of the clamping members the rod 51 must be pulled so as to engage the end wall of its slot 54 with the pin 55, and thereby the arm 63 to which it is fixed is turned about the axis of the plug valve. In this turning movement the pivotal connection 64 is carried in a counter-clockwise direction across a line between the axes of the plug valve 41 and the pintle 70. As soon as the pivotal connection 64 crosses this line, the coil spring 67 automatically continues turning the arm or lever 63. As the pin 55 is adapted to engage either of the arms 58 which are fixed to the stem of the plug valve, the latter will be opened by the action of spring 67, which is halted when the second of the arms 58 engages the stop 60.

There being suitable fluid pressure at this time on the under side of the piston 33, the opening of the plug valve 41 is followed by complete retraction of the clamping members 18. At about the completion of their retracting movement the finger 72 on one of the clamping members engages the roller 62 and rotates the sleeve member 61 and its integral arm 63 in a clockwise direction, as viewed in Fig. 3. This carries the pivotal connection 64 back across the line between the axes of the valve plug 41 and the pintle 70 and consequently allows the coil spring 67 to snap the valve closed. Thus the oil check mechanism is set at the completion of one mold-closing operation in a position ready to function automatically in the next succeeding mold-closing operation.

Fluid under pressure, such, and preferably, as air, may be supplied to the cylinder 20 and to the tandem cylinders formed in the lift piston rod 22 in any suitable manner. A suitable valve is indicated in detail in Figs. 11 and 12. Air may be supplied this valve through the line 74 and exhausted through the line 75. Air may be supplied to and from the underside of the lift piston 21 and also exhausted through the valve passage 76. From the upper valve passage 77 and through the hose 78 and port 79 air may be supplied to and exhausted from the upper side of the piston 33. Air may also be supplied to the upper side of the piston 32 through the duct 80 formed by suitably boring out the piston rod 31.

In this way the pistons may be simultaneously forced down by fluid pressure so as to expand the clamping members. To retract the clamping members air need be supplied only to the under side of the piston 33. For this purpose the main valve is formed with an auxiliary passage 81 in communication through the hose connection 82 with a port 83 that is formed in the wall of the cylinder 35 and opens to the under side of the piston 33 at the point indicated at 84. The valve operating handle 85 is shown in the drawings in the neutral position.

By suitably shifting the valve operating handle 85, air may be opportunely supplied to several cylinders or exhausted therefrom in a manner well known.

In operation, assuming the molds at rest on a gathering section of a conveyor having roller treads, the press is moved to a position substantially above a mold and by the hoist 5 lowered until the abutment ring 17 seats on the mold. If the clamping members are not already sufficiently low enough, the piston 21 is lowered by exhausting air from its under side. The clamping members are then spread apart until their vertical body portions 25 are in contact with the inner periphery of the mold and the members and the abutment ring 17 thereby brought into concentric relation therewith. The clamping members are then retracted a predetermined extent so as to clear slots in the mold sections and thus facilitate the introduction of mold clamps. The clamping members are then lifted and in cooperation with the abutment ring 17 the sections of the mold are brought together. The mold clamps are then positioned. The clamping members are lowered and then completely retracted so that they may be bodily lifted through the openings in the mold. Obviously the clamping members may be lifted if desired above the plane of the abutment ring 17 by suitably proportioning the cylinder 20. Preferably, however, the hoist 5 is utilized to completely clear the mold of the clamping members when a closing operation has been completed.

The invention is not limited, of course, to any of the details of construction previously set forth, the same being merely intended to disclose an operative embodiment. While the press is primarily designed to operate in conjunction with a mold conveyor, it is obviously capable of service when the molds are otherwise supported, as, for instance, on tables suitably cut away so as not to obstruct operation of the clamping members. In its broad aspects the invention contemplates inversion of the press and either stationary or portable. Obviously the mechanism by which the press is suspended may be arranged to travel in the direction of and with the mold conveyor so as to permit closing the molds without halting their movement. And obviously, of course, it is not confined to mold conveyors having roller type treads; the same might be of the platform type. Reference should be had to the claims for an understanding of the scope of the invention.

Having thus described my invention, what I claim and desire to protect by Letters Patent is:

1. A horizontally and vertically movable sectional mold-closing device having in combination, members engageable with opposite sides of a mold, and means for moving at least one of the members relative to the other and axially of the mold to close its sections together.

2. A mold-closing device having clamping members, and means for operating the same, in combination with, a conveyor having spaced tread members, said clamping members including jaws spaced to permit straddling at least one of the tread members and shaped to permit their engagement with the mold in opposition to the other clamping member whereby a sectional mold may be closed while on the conveyor.

3. In combination, a conveyor for sectional molds, and movable means for clamping the sections of a mold together while moving on said conveyor.

4. In combination, a conveyor for sectional molds, and means independent of the conveyor for clamping the sections of the mold together without stressing the conveyor in the mold-closing operation.

5. A portable mold-closing press having in combination, an abutment member on which it is adapted to be seated on a mold, clamping means shaped to engage the opposite sides of a mold and cooperate with the abutment member, and means for operating the clamping means.

6. A portable mold-closing press having in combination, an abutment member on which it is adapted to be seated on a mold, clamping members spaced apart to adapt them to straddle a conveyor tread and shaped to enter an annular opening in a mold and engage its margins, and means for operating the clamping members.

7. A portable mold-closing press having in combination, an abutment member on which it is adapted to be seated on a mold, a plurality of clamping members each of which has jaw portions adapted to straddle a conveyor tread and shaped to pass through the opening in an annular mold and engage its margins, and means for operating the clamping members.

8. A portable mold-closing press having in combination, an abutment member on which it is adapted to be seated on a mold, clamping members cooperating with the abutment member, and means for moving the clamping members in substantially right-angular paths.

9. A portable mold-closing press having in combination, an abutment member on which it is adapted to be seated on a mold, clamping members cooperating with the abutment member, and means for moving the clamping members substantially vertically and horizontally.

10. A portable mold-closing press having in combination, an abutment member on which it is adapted to be seated on a mold, clamping members shiftable both transversely and parallel to the abutment member, and fluid-pressure-operable devices for so actuating the clamping members.

11. A portable mold-closing press having in combination, an abutment member on which it is adapted to be seated on a mold, clamping members having jaw portions arranged substantially parallel the abutment member and offset vertical body portions, means for moving the clamping members and their jaws vertically, and means for moving the clamping members and their jaws horizontally.

12. A portable mold-closing press having in combination, an abutment member on which it is adapted to be seated on a mold, clamping members having rigid jaw portions arranged substantially parallel the abutment member and offset vertical body portions, means for moving the clamping members and their jaws vertically, means for moving the clamping members and their jaws horizontally, and means limiting horizontal movement of the jaws to a predetermined extent in at least one direction.

13. A portable mold-closing press having in combination, an abutment member on which it is adapted to be seated on a mold, clamping members, means for moving the same transversely of the abutment member and down through the opening in the annular mold, means for moving the clamping member horizontally to bring the press into concentric relation with the mold, and automatic devices for halting horizontal retracting movement of the clamping members in predetermined spaced relation from the inner periphery of the mold.

14. A portable mold-closing press having in combination an abutment member on which it is adapted to be seated on a mold, clamping members, means for moving the same transversely of the abutment member and down through the opening in the annular mold, means for moving the clamping member horizontally to bring the press into concentric relation with the mold, automatic devices for halting horizontal retracting movement of the clamping members in predetermined spaced relation from the inner periphery of the mold, and manual means for rendering the automatic devices ineffective to permit complete retraction of the clamping members after a mold-closing operation has been completed.

15. A portable mold-closing press having in combination an abutment member on which it is adapted to be seated on a mold, clamping members, means for moving the same transversely of the abutment member and down through the opening in an annular mold, and fluid check mechanism permitting free spread of the clamping members but halting retraction thereof at a predetermined location whereby the press may be centered on a mold and mold clamps readily introduced.

16. A mold-closing press shiftable bodily in a vertical direction and having in combination an abutment member, clamping members movable vertically and horizontally, and means for operating the clamping members.

17. A mold-closing press shiftable bodily in a vertical direction and having in combination an abutment member, clamping members movable vertically and horizontally, means for operating the clamping members, and automatic means for halting horizontal movement of the clamping members in pre-determined spaced gripping relation with the mold.

18. A device of the character described, including means capable of being introduced from above through the opening of a tire mold, and of automatically engaging the mold from beneath to support the same; and means operative in opposition to the first mentioned means for applying pressure to hold the mold parts tightly closed.

19. A grappling device for annular tire molds, including means to enter the mold opening from above and to engage and support the mold from beneath for transportation, and means to engage the mold from above and compress the same between said means and the supporting means.

20. A grappling device for annular tire molds, including means to enter the mold opening from above and to engage and support the mold from beneath for transportation, means engaging the mold from above to effect clamping action thereupon, and means for applying a compressive effort to the clamping means.

Signed at Hartford, county of Hartford and State of Connecticut, this 30th day of March 1921.

HECTOR V. LOUGH.